Dec. 31, 1929.  F. S. CARR  1,742,131
NUT AND SCREW FASTENING
Filed July 22, 1925
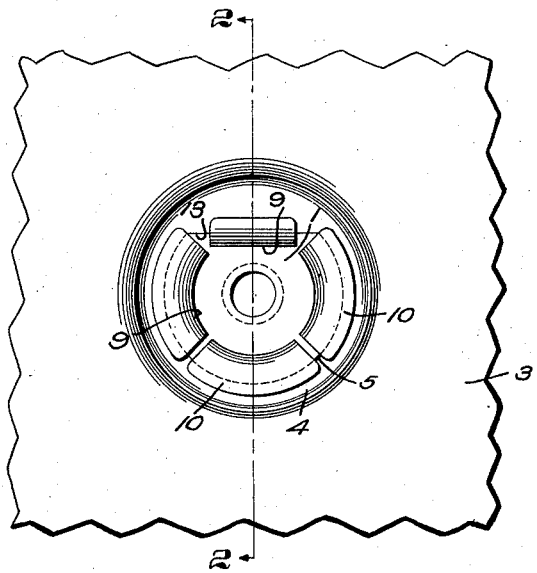
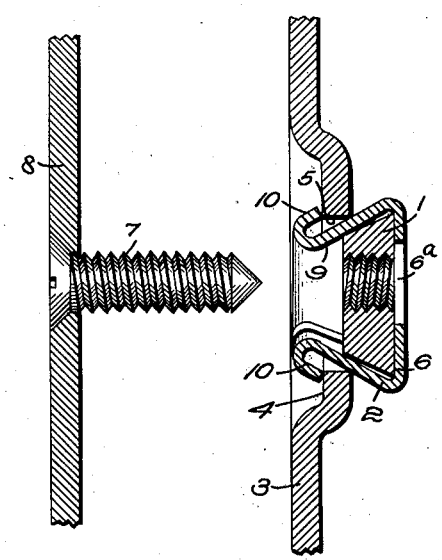
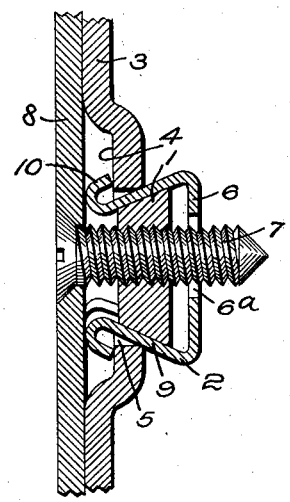
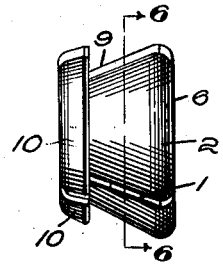
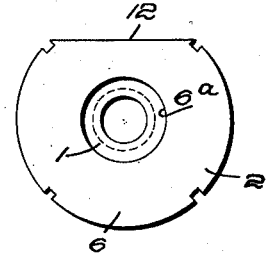
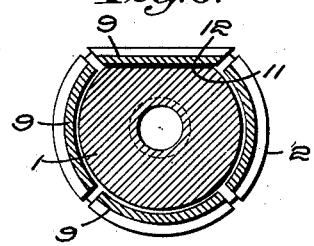
Inventor:
Fred S. Carr,
by Emery Booth Janney & Varney
Attys.

Patented Dec. 31, 1929

1,742,131

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, A CORPORATION OF MASSACHUSETTS

NUT AND SCREW FASTENING

Application filed July 22, 1925. Serial No. 45,264.

This invention aims to provide an improved nut and screw fastening installation.

In the drawings, which illustrate a preferred embodiment of my invention:—

Figure 1 is an elevation view of the nut-holder and a portion of its support;

Fig. 2 is a section on the line 2—2 of Fig. 1, also including an elevation view of the screw and section of the part to be secured to the nut-holder support before engagement of the screw with the nut;

Fig. 3 is a section showing the parts, shown in Fig. 2, secured together;

Fig. 4 is a side elevation of the nut-holder and nut;

Fig. 5 is a rear elevation of the nut-holder and nut; and

Fig. 6 is a section on the line 6—6 of Fig. 4.

Referring to the drawings, I have shown fastening elements in the nature of a nut and screw which are particularly, though not exclusively, useful in automobile body construction. The type of fastening elements shown are peculiarly adapted for securing hinges, locks, plates, etc., to metal frame parts that are practically inaccessible after the part to be attached is placed over the frame. This type of fastening is desirable even where the back of the frame is accessible because the nut does not have to be held while the screw is being engaged therewith. Thus labor and expense are saved by the use of such fastening devices.

The fastening elements, as illustrated in the drawings, are shown in connection with fastening two sheet metal parts together so that the face of one lies against the face of the other. One of these parts carries the nut element of the fastening device and the other carries the screw, as best illustrated in Figs. 2 and 3.

In many instances, the nut cannot be held in place while the screw is being engaged therewith without some means, other than a tool, for holding it in assembled relation with the part back of which the nut is to be located. Therefore, I have provided a cup-shaped nut element which includes a nut 1 and a nut-holding part 2 which may be easily and quickly engaged with a support 3.

The support 3 is initially prepared for receiving the cup-shaped nut-holding part 2 by forming a recessed area 4 therein having an aperture 5 through which a portion of the nut-holding part may be entered, the remainder of the part 2 being too large in diameter to pass through the aperture.

The cup-shaped nut-holder 2 is pressed from a single piece of metal and presents a base 6, having an aperture 6ª therethrough, through which the screw 7 may pass when the part 8 is secured against the support 3, as illustrated in Fig. 3. A plurality of resilient fingers 9 are formed integral with the base 6 by slitting the wall of the nut-holder and these extend away from the base to surround the nut 1. The fingers 9 and nut are inclined so that the nut may be held in assembled relation and provide a cross-sectional area which is small enough to pass through the aperture 5 when the fingers are contracted by contact with the wall surrounding the aperture. The free ends of the fingers 9 are bent to provide reversely bent portions 10, the purposes of which will be more fully hereinafter described.

Both the nut 1 and nut-holder 2 are provided with flattened sides 11 and 12 respectively, which provide means for preventing relative rotation. One finger is flattened to cooperate with the flattened side of the nut 1, as best illustrated in Fig. 6.

When the above described type of screw-receiving means is used in automobile body construction, the nut-holder 2, carrying the nut 1, may be snapped into engagement with the body at any time during assembly of the body parts and will remain in place no matter at what angle its supporting part may be tipped thereafter. This particular type of device is pressed through the aperture 5 from the back face of the support 3 (Fig. 2). The flattened side 12 of the nut-holder 2 is registered with the straight wall 13 of the aperture 5 (Fig. 1) thereby preventing rotation of the nut-holder relative to the support 3.

The fingers may contract during passage through the aperture 5 because they are normally spaced away from the nut sufficiently to permit such contraction. When the nut-holder 2 is secured to the support 3, the reversely bent portions 10 are located within the depressed area and the outer ends extend beyond the aperture 5 and engage the face of the support to prevent disengagement of the nut-holder from the support until the fingers are contracted. The reversely bent portions are substantially flush with the outer surface of the support, as best shown in Figs. 2 and 3.

When securing the metal plates together, the nut is drawn toward the ends of the fingers until it clamps the fingers tightly against the edge of the wall surrounding the aperture 5. Thus the nut-holding part 2 is held tightly against its support.

The cooperating straight or flat sides of the aperture 5, the flat finger and the side of the nut prevent relative rotation between the support and nut-holder and the nut-holder and nut to permit the screw to thread its way into the nut. It is therefore only necessary to enter the screw in the threaded hole of the nut and turn the screw to secure the two metal parts together.

While I have shown and described a preferred embodiment of my invention, it will be understood that changes involving omission, substitution, alteration and reversal of parts, and even changes in the mode of operation, may be made without departing from the scope of my invention, which is best defined in the following claims.

Claims:

1. A fastening installation comprising, in combination, a support presenting a non-circular aperture, a cup-shaped nut-holding part and a nut assembled within the said nut-holding part, the peripheral portion of said nut-holding part being split to provide a series of resilient fingers substantially encircling the said nut and said fingers being snapped through the aperture in the support to hold the nut in position relative thereto, said nut-holding part and said nut each having a non-circular-cross-section similar to the cross-section of said aperture, thereby cooperating to prevent turning movement of the nut-holder relative to the support or the nut relative to the nut-holder and said nut being free to move toward the support to back support the resilient fingers and prevent contraction thereof.

2. A fastening installation comprising, in combination, a support having an aperture therethrough, a depressed area surrounding said aperture, a cup-shaped nut-holder slotted to provide a series of inclined fingers which are snapped through the aperture in said support, said fingers having reversely bent portions at their free ends which are disposed entirely within the depressed area so that said support may present a substantially flush outer surface when the fastening device is attached thereto, a tapered nut circumferentially enclosed by said fingers and held in assembly with the nut-holder thereby and means permitting axial movement of the nut relatively to the nut-holder to back-support the fingers and hold them against a wall surrounding the aperture through the support.

3. In combination, a cup-shaped nut-holder having a base and an inclined side wall, said wall being slotted to provide a plurality of inclined contractible and expansible fingers having outwardly and rearwardly bent portions at their free ends and a tapered nut substantially encircled by said fingers and initially assembled with said holder and means for preventing relative rotation between the nut and nut-holder, said nut being adapted to be moved toward the open end of the cup-shaped nut-holder to back-support and prevent contraction of said fingers.

4. A fastening installation comprising, in combination, a support presenting a non-circular aperture, a cup-shaped nut-holder slotted to provide a plurality of resilient fingers, said fingers being snapped into the aperture in the support and a nut substantially encircled by said fingers and held in position by said nut-holder, the wall surrounding the aperture in the support, the nut-holder, and the nut each being provided with cooperating flat sides to provide interengaging means which prevent relative turning between said parts.

In testimony whereof, I have signed my name to this specification.

FRED S. CARR.